United States Patent Office 3,019,799
Patented Feb. 6, 1962

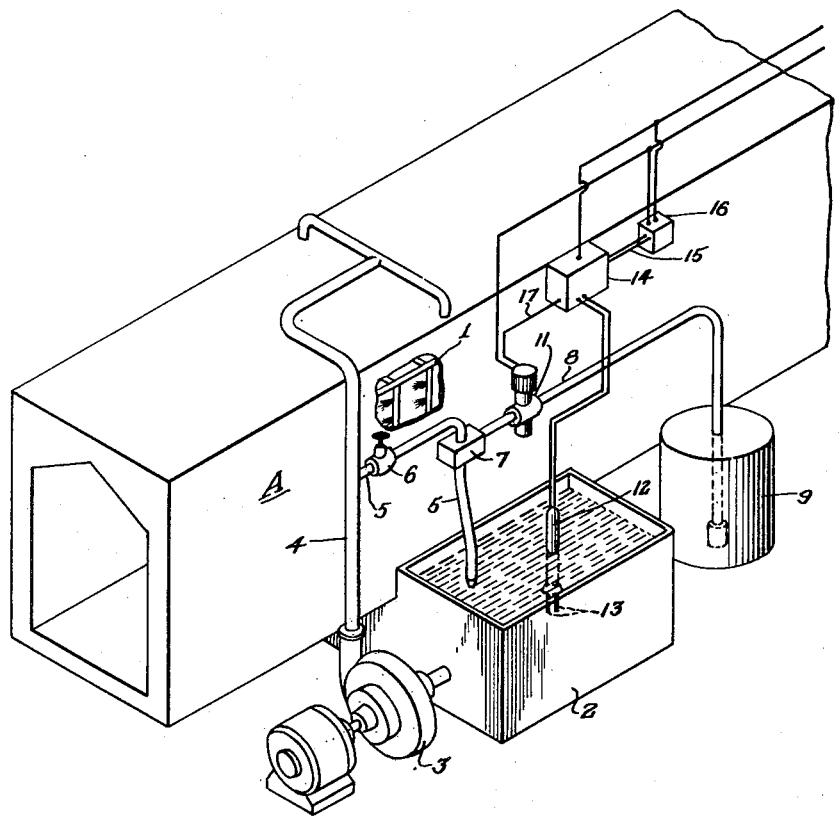

3,019,799
APPARATUS FOR SPRAYING ARTICLES AND FOR CONTROL OF ELECTROLYTE CONCENTRATIONS
Alfred Douty, Wyncote, Pa., assignor to Amchem Products, Inc., Ambler, Pa., a corporation of Delaware
Filed July 7, 1959, Ser. No. 825,437
4 Claims. (Cl. 134—57)

This invention relates to the art of treating a succession of metal articles by a solution of chemicals for the purpose of cleaning or phosphatizing the articles or to prepare the surface of the articles for the reception of a final finish such as paint, varnish, enamel or the like. Typical examples of such solutions are caustic solutions of electrolytes in which the concentration of the chemicals in the solution can be ascertained by measurement of the conductance of the solution.

Such solutions are frequently applied to the work by means of sprays and as they act upon the work to clean, phosphatize, or otherwise affect the surface, the solutions become partially depleted in chemical content. These partially depleted solutions are drained back into the main reservoir for recirculation through the spray nozzles.

The replenishment of the electrolytic solutions used in the processes is usually accomplished by periodically adding to the main reservoir liquid concentrates of the active ingredients to compensate for the depletion of such ingredients by application to the work. When this replenishment is under the control of the operator, careful attention is required and the operation is subject to human vagaries both as to the need for replenishment and the frequency with which it is effected.

It is the primary object of my invention to provide means to automatically sense the need for replenishment of the electrolyte solution and effect the addition of fresh concentrate of the active ingredients to the solution to maintain the proper concentration of chemicals in the solution to produce the desired results on the work being treated.

In solutions of electrolytes of the character used in the treatment of materials to effect the results described above when the chemical concentration of the treating solution is decreased there is an increase in conductivity and when the solution has been replenished with fresh chemical concentrate the conductivity of the bath decreases.

I use this difference in conductivity of the solution as sensed by an appropriate form of sensing device to provide for automatic control of supply of fresh concentrate to the solution.

A spraying equipment embodying a preferred form of my conductance controlled concentration regulator is illustrated in the accompanying drawings wherein reference letter A indicates a spray chamber having a spray distribution system 1 through which the articles under treatment pass in a manner well understood in the art. The reservoir for the treating solution is shown at 2 and a motor driven pump 3 withdraws the solution from the reservoir and delivers it through the pipe 4 to the spray distribution system 1. The floor of the chamber A is open to permit the return of the sprayed solution to the reservoir 2.

A return pipe 5 is connected to the pipe 4 a short distance above the pump 3. This line 5 leads through a shut-off valve 6 to a syphon or aspirator 7 and thence returns to the reservoir. When the pump is in operation and the valve 6 is open there will be a constant return flow of the solution from the pipe 4 through the line 5 to the reserrvoir.

The aspirator is connected by means of a line 8 to the drum 9 which holds a supply of concentrated replenishing material. A solenoid valve 11 is connected into the line 8 between the aspirator 7 and the drum 9. This solenoid valve has only two positions—either open or shut.

When the pump is operating and there is a flow of solution through the aspirator 7, with the valve 11 in open position there will be a flow of concentrated replenishing material from the drum 9 to the line 5 where it is mixed with the return flow of the solution passing through the line 5. When the flow of replenishing material has been sufficient to increase the concentration of the solution to the desired point, the solenoid valve 11 will be moved to closed position and the flow of the replenishing material to the line 5 will be cut off until the concentration of the solution in the reservoir 2 falls below a predetermined point.

The operation of the solenoid valve 11 is controlled in the following manner. A conductance cell 12 of known construction having a pair of electrodes 13 is immersed in the electrolytic solution in the reservoir 2. This cell 12 should be located in the reservoir at a point remote from the discharge of line 5 into the reservoir in order to reflect a fair average representation of the concentration of the solution. The electrodes of the conductance cell are connected to the conductance controller 14, an example of which is illustrated in my application, Serial No. 459,020, now Patent No. 2,897,436. The conductance controller 14 is energized from 110 v., 60 c. supply line to which it is connected by line 15 leading to outlet box 16, in turn connected to the supply line. In response to signals representing changes in conductivity derived from the conductance cell 12, the conductance controller 14 delivers control impulses to the line 17 which actuate the solenoid of the valve 7 to open the valve when the concentration of the solution in the reservoir 2 falls below the predetermined minimum and closes the valve when the concentration reaches the predetermined maximum.

The apparatus which I have disclosed and described provides a simple and effective means for maintaining a proper range of concentration for the electrolytic solutions used in various spray application systems. A single pump only is required to operate the application of the spray to the work and to effect replenishment of the solution when necessary. The conductance controller can be adjusted in a manner well known in the art to provide a proper range of concentration for various solutions which may be used in the spray and the device is then applicable to many spray treating processes.

I claim:
1. In a system for spraying a succession of metal articles with an electrolytic sólution, a spraying station, a spray at said spraying station, a reservoir for the solution, a system for circulating the solution from the reservoir to the spray and returning it to the reservoir, means for controlling the concentration of chemicals in the solution comprising a sensing device immersed in the solution, a solution return pipe connected into said circulating system between the reservoir and the spray, an aspirator in said return pipe, a concentrate reservoir, a pipe connecting said concentrate reservoir to the aspirator, a valve in said concentrate pipe and means responsive to impulses from said sensing device to control the operation of said valve.

2. In a system for spraying a succession of metal articles with an electrolytic solution, a spraying station, a reservoir for the solution, a spray at said spraying station, a line connecting the reservoir to the spray, a pump circulating the solution through said line, a return for the sprayed solution from the spraying station to the reservoir, means for controlling the concentration of chemicals in the solution comprising a sensing device immersed in the solution, a concentrate reservoir, a line connecting the concentrate reservoir with the solution reservoir and means operatively associated with said first line for causing circulation of the concentrate through said concentrate line, a valve in said concentrate line and actuating means for opening and closing said valve, said actuating means being responsive to the concentration of chemicals in the solution reservoir as sensed by said sensing device.

3. In a system for spraying a succession of metal articles with an electrolytic solution, a spraying station, a reservoir for the solution, a spray at said spraying station, a line connecting the reservoir to the spray, a pump circulating the solution through said line, a return for the sprayed solution from the spraying station to the reservoir, means for controlling the concentration of chemicals in the solution comprising a sensing device immersed in the solution, a solution return pipe connected into said first line, an aspirator in said solution return pipe, a concentrate reservoir, a pipe connecting said concentrate reservoir to the aspirator, a solenoid valve in said concentrate pipe and means responsive to impulses from said sensing device to open and close said valve.

4. In a system for spraying a succession of metal articles with an electrolytic solution, a spraying station; a reservoir for the solution, a spray at said spraying station, a line connecting the reservoir to the spray, a pump circulating the solution through said line, a return for the sprayed solution from the spraying station to the reservoir, means for controlling the concentration of chemicals in the solution comprising a conductance cell immersed in the solution, a conductance controller responsive to impulses from said cell, a solution return pipe connected into said first line, an aspirator in said solution return pipe, a concentrate reservoir, a pipe connecting said concentrate reservoir to the aspirator, and a solenoid valve in said concentrate pipe responsive to signals from said conductance controller to open and shut said valve.

References Cited in the file of this patent
UNITED STATES PATENTS

| | | |
|---|---|---|
| 1,576,001 | Olden | Mar. 9, 1926 |
| 1,865,289 | Trowbridge | June 28, 1932 |
| 2,222,516 | Powell | Nov. 19, 1940 |
| 2,370,609 | Wilson | Feb. 27, 1945 |
| 2,621,673 | Hodgens | Dec. 16, 1952 |
| 2,788,008 | Wanzer | Apr. 9, 1957 |